United States Patent [19]

Moss et al.

[11] Patent Number: 5,016,953
[45] Date of Patent: May 21, 1991

[54] REDUCTION OF NOISE IN COMPUTER GENERATED HOLOGRAMS

[75] Inventors: Gaylord E. Moss, Marina del Rey; John E. Wreede, Monrovia, both of Calif.

[73] Assignee: Hughes Aircraft Company, Los Angeles, Calif.

[21] Appl. No.: 401,328

[22] Filed: Aug. 31, 1989

[51] Int. Cl.$^5$ .................. G03H 1/20; G03H 1/08
[52] U.S. Cl. .................. 350/3.66; 350/3.69; 350/3.77; 430/1; 430/2
[58] Field of Search ............ 350/3.6, 3.66, 3.69, 350/3.74; 430/1, 2, 3.77

[56] References Cited

U.S. PATENT DOCUMENTS 4,832,424 5/1989 McGrew .................. 350/3.69

FOREIGN PATENT DOCUMENTS 1-68784(A) 3/1989 Japan .................. 350/3.69
1-68785(A) 3/1989 Japan .................. 350/3.69
2119111 11/1983 United Kingdom .......... 350/3.69

OTHER PUBLICATIONS

Dickson, "Method for Producing Sub-Master Holograms," *IBM Technical Disclosure Bulletin*, vol. 24, No. 4, Sep. 1981, pp. 1896–1897.

*Primary Examiner*—Paul M. Dzierzynski
*Assistant Examiner*—Martin Lerner
*Attorney, Agent, or Firm*—Leonard A. Alkov; Wanda K. Denson-Low

[57] ABSTRACT

Noise is reduced in computer generated holograms (CGH's) by a method of overexposure. The CGH is used to make a master hologram. The master hologram is then used to make a copy from which a succession of other copy holograms is made. Each successive copy hologram is exposed less than the prior ones while increasing brightness uniformity. Consequently, a decreasing amount of change in exposure is required to reach 100% efficiency. The number and orientation of the copy holograms is incorporated into the design of the final optical element. The final hologram is not overexposed, since the amount of exposure has been reduced from the earlier holograms, and can be used in complex optical power systems.

9 Claims, 2 Drawing Sheets

REDUCTION OF NOISE IN COMPUTER GENERATED HOLOGRAMS

BACKGROUND OF THE INVENTION

1. Field of the Invention

The subject invention generally relates to computer generated holograms and, more particularly, to a method of reducing noise in diffraction optical elements made from computer generated hologram originals.

2. Description of Related Art

Many systems involve complex optical power, such as head-up displays, helmet mounted displays, and even automotive holographic displays. These systems require, or at least benefit from, high-grade optical elements which might be produced from computer generated holograms (CGH's). A general discussion of making a copy hologram from a master hologram is found in U.S. Pat. No. 4,530,564 and incorporated herein by reference. As is well known, in a CGH, the design of the desired wavefront is mathematically described and a computer can then form a two-dimensional amplitude hologram representative of that wavefront. The computer can drive a printer to produce the desired diffraction grating on a substrate or, alternatively, create the grating by electronic or chemical procedures.

It is anticipated that head-up displays (HUD's) will employ computer generated holograms rather than aspheric mirrors to provide one or both of the necessary wavefronts to construct the optical element. This might be particularly true in modern aircraft where there is frequently minimal space in the cockpits. This limitation requires that the optical system be folded and compressed for a HUD. Complex aspheric reflecting mirrors are therefore required. Aspheric mirrors have been fabricated for use as a master reference in producing HUD holograms. This approach, however, involves lengthy and expensive procedures of grinding an aspheric mirror to meet the requirements of a particular HUD. An aspheric mirror also has a limitation as to how close it can be placed relative to the recording medium for replicating the aspheric diffraction grating in the recording medium.

Holograms, such as CGH's, producing the same effect as the aspheric mirrors, represent a lightweight and efficient solution to the above. However, a major problem in using a CGH as an imaging source for the fabrication of a holographic HUD combiner is the noise or artifacts in the CGH. These artifacts are present in the form of general nonuniformities of brightness and in multiple order scattering. The multiple order artifact results from the fringe pattern being generally formed in abrupt discrete units rather than a sinusoidal variance, as in an ideal holographic recording of a laser interference pattern.

In the past, spatial filtering techniques have been used to remove some of these artifacts, such as small, abrupt, high frequency changes.

One spatial filtering method adapted for a CGH includes a relative motion system developed by the present inventors. In that motion system, multiple order artifacts are sought to be removed by using a moving point source of coherent illumination for illuminating the computer generated diffraction grating. By providing a slight movement to the point source, the desired recording ray is changed only slightly. However, the noise scattering rays, which are the result of individual scattering elements rather than the diffraction effect of the complete assemblage of the fringe pattern, are displaced by a substantial distance. As a result, the scatter holograms are reduced by being smeared out with minimal effect on the main hologram.

One major drawback to the prior art filtering techniques is the limited extent to which artifacts are filtered. For example, broad, low frequency variations may not be adequately removed, if at all. Another drawback is that the techniques tend to be cumbersome and time consuming.

A need therefore exists in the art to provide an improved method for reducing noise created by artifacts in computer generated holograms. A multiple intermediate hologram technique has been employed in the prior art but is used to provide more optical power in the final hologram. According to this method, each intermediate step includes a new computer generated hologram with its own set of computer generated artifacts. This, however, does not teach or suggest the use of intermediate holograms to remove artifacts according to the present invention.

SUMMARY OF THE INVENTION

It is therefore an object of the present invention to improve holographic displays.

Another object of the present invention is to provide an improved method of creating optical elements from computer generated holograms.

Yet another object of the present invention is to reduce noise in optical elements fabricated from computer generated holograms.

Still another object of the present invention is to alleviate the effects of artifacts in computer generated holograms.

According to the invention, noise is reduced in diffraction optical elements made from computer generated hologram originals by making intermediate copy holograms initially from the CGH. Each intermediate copy hologram is made from a predecessor copy hologram. The intermediate copy holograms are in the region where large changes in exposure level make only small changes in the efficiency (i.e., the region where saturation occurs). Each successive intermediate hologram increases the brightness of the relatively dim areas to increase uniformity. The effect is that the hologram will become more and more uniform in efficiency, i.e., reduce the effects of artifacts. The final hologram produced is thereby quite uniform. Thus, the technique according to the present invention masks artifacts by the method of overexposing.

DETAILED DESCRIPTION OF THE PREFERRED EMBODIMENT

The following description is provided to enable any person skilled in the art to which the present invention pertains, or with which it is most nearly connected, to make and use the invention, and sets forth the best mode contemplated by the inventors of carrying out their invention. Various modifications, however, will remain readily apparent to those skilled in the art since the generic principles of the present invention have been defined herein specifically to provide an improved method of reducing noise in optical elements fabricated from computer generated holograms.

Figure 1:
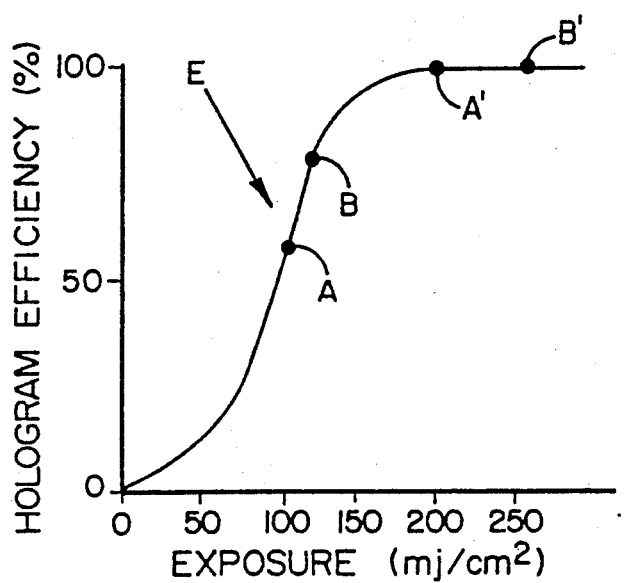
FIG. 1 is a graph illustrating a model efficiency curve for a dichromated gelatin reflection hologram.

As known in the art, holograms can be constructed of various types of photosensitive films including, for example, dichromated gelatin. The efficiency of holograms in reconstructing images is not only affected by the materials used as the photosensitive film, but also the artifacts or noise produced in constructing the hologram. FIG. 1 depicts for purposes of illustration a model brightness or efficiency curve E of a dichromated gelatin hologram as a function of exposure.

The efficiency curve E shows that, as the exposure increases from zero to about 150 mj/cm$^2$, the efficiency rapidly increases for the particular dichromated gelatin hologram in this particular embodiment. Beyond 150 mj/cm$^2$, the efficiency curve E flattens, which indicates that the hologram is becoming saturated or perhaps overexposed. At about 400 mj/cm$^2$ (not shown), a change of about 20% in exposure has little effect on the efficiency of the hologram. Of course, the above efficiency characteristics vary, depending upon the specific type of gelatin used and specific concentration of dichromate. As further described below, the present invention utilizes a method of making a succession of intermediate copy holograms such that the later made intermediate holograms are ideally described by the flat region of the efficiency curve E which results from the high uniformity in brightness found in the hologram.

For example, the curve E contains points A, B, which may denote two areas or loci of an earlier made intermediate copy hologram. Point A may represent an efficiency of about 50% and point B about 70%. In other words, point A is less bright than point B. As more intermediate copy holograms are produced, the points A, B effectively move along the efficiency curve E towards and eventually to points A', B' in a later intermediate hologram. This is due to the fact that the brightness of point A rapidly increases in comparison to the increase at point B. Accordingly, point A' may be at an efficiency of about 97% and point B' at about 99%. When points A', B' are reached, the hologram brightness with respect to those loci are greatly increased over the earlier hologram relative to points A, B, and consequently overall efficiency or uniformity has increased. It can be appreciated that if not simply two loci, but rather a large number of loci are considered over the hologram, the later made hologram has greater uniformity in brightness, as compared to an earlier made hologram.

Figure 5:
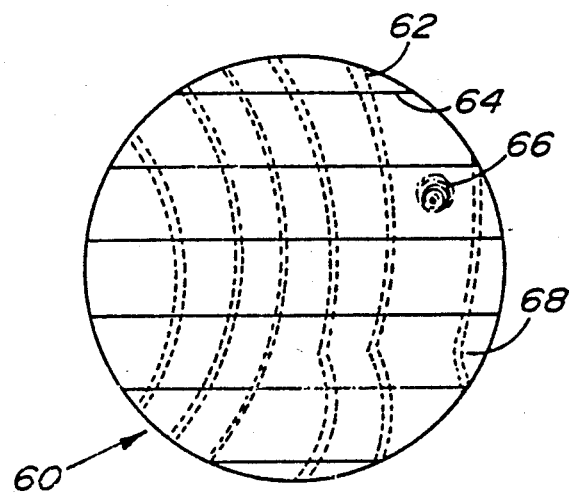
FIG. 5 is a schematic diagram of some typical artifacts in a CGH image.

The need to maximize hologram efficiency is particularly important in CGH's wherein the artifacts in the image from a CGH can cause brightness variations of 50% or more. FIG. 5 depicts, for purposes of illustration, a CGH image 60 with various types of artifacts which represent dim areas of the CGH which are to be brightened according to the present invention. An artifact 62 may be due to intensity variation. Artifact 64 may be a sharp intensity band, while artifact 66 is from dirt. A discontinuity due to lost data may result in artifact 68. Thus, the CGH image 60 can obviously satisfy only minimal image requirements. The present invention, however, overcomes these image deficiencies by using, in part, well-known methods of optical element production.

Figure 2:
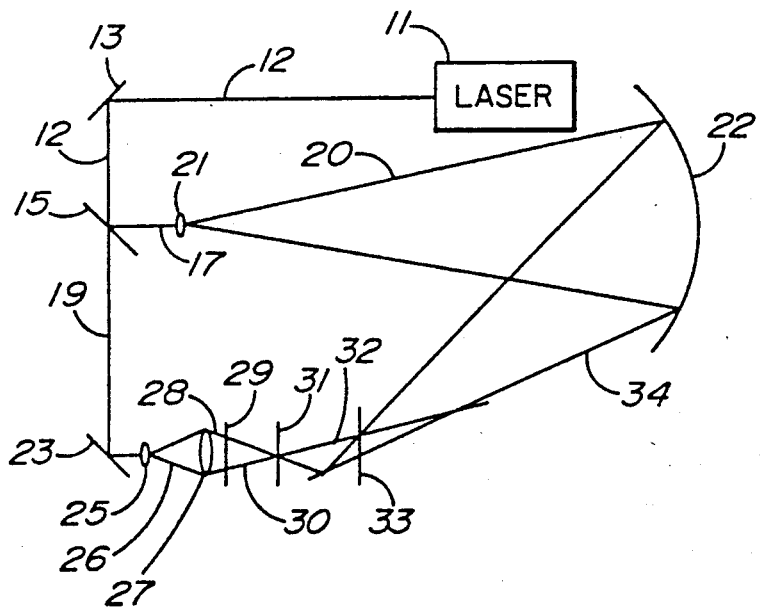
FIG. 2 is a schematic diagram of an apparatus for making a master reflective hologram from a CGH.

FIG. 2 shows a standard method of making a holographic optical element from a CGH. This is the initial step of the present invention. The CGH is used as a transmission element in a double beam exposure system to generate a reflection hologram which is physically larger than the CGH and has more optical power. The reflection hologram is then used in a single beam exposure system (described below) to begin the generation of a succession of intermediate copy holograms.

The double beam exposure system includes, in this particular embodiment, a laser 11 whose output 12 reflects off a mirror 13 to a beam splitter 15. From the beam splitter 15, a first split beam 17 is supplied to a spatial filter 21, whose output 22 is supplied to a concave mirror 22. A second split beam 19 from the beam splitter 15 reflects off a mirror 23 to a second spatial filter 25. An output 26 of the spatial filter 25 is supplied to a fast positive lens 27, which focuses its output 28 onto a computer generated hologram 29. The CGH 29 operates as a transmission element and transmits its output 30 through a pin hole stop 31 to remove multiple exposure orders and high frequency artifacts and thereby provide an output 32 onto a holographic plate 33. The first split beam 20 which was reflected off the concave mirror 22 provides a reflected beam 34 directed onto the holographic plate 33 where it interacts with the output 32 to form a master reflection hologram 33a in the plate 33.

Figure 3:
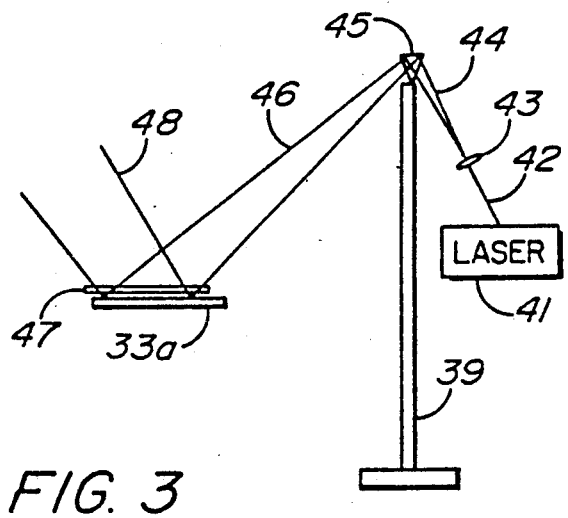
FIG. 3 is a schematic diagram of an apparatus for making a copy hologram from a master hologram.

As noted above, the resulting reflection hologram 33a is then used in a single beam exposure system to generate the final optical element, as shown in FIG. 3. The single beam exposure system includes, in this particular embodiment, a laser source 41 whose output 42 passes through a relay lens 43. An output 44 from the lens 43 reflects off a mirror 45 which is supported by a support system 39. The mirror 45 provides an output 46 which reflects off the master reflection hologram 33a to produce a reflected wavefront 48 and thereby create a copy hologram 47.

According to a preferred embodiment of the present invention, the single beam exposure is repeated several times. In the first step of the method, the master hologram 33a is made and then acts as a mirror in the single beam system. Since this hologram 33a contains artifacts, the copy hologram 47 will also contain the same artifacts. FIG. 1 indicates that these artifacts will be reduced if the copy hologram 47 is overexposed, i.e., again exposed, although they will still be present. But, as is well known, overexposure results in undesirable characteristics. However, according to the preferred embodiment, the copy hologram 47 is not the final hologram, and thus can be overexposed. The overexposed copy hologram 47 is then used to make a subcopy which can be used to make a sub-subcopy. The step of copying from a former copy can be repeated as necessary to achieve the desired brightness uniformity.

Figure 4:
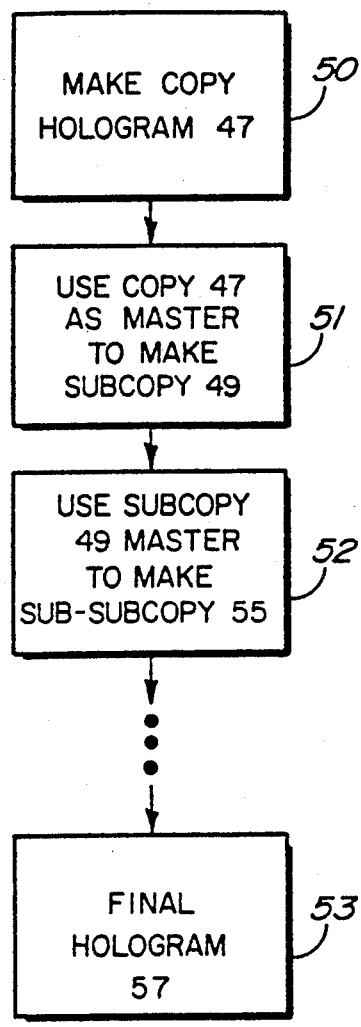
FIG. 4 is a flow diagram illustrating a preferred embodiment according to the present invention.

The above steps are illustrated in FIG. 4 where it is shown that, in step 50, the copy hologram 47 is made from the master hologram 33a. In step 51, a subcopy hologram 49 is made using the copy hologram 47 which is used in place of the master hologram 33a in FIG. 3. A sub-subcopy hologram 55 is then made using the subcopy 49 in place of the master 33a in FIG. 3, as shown in step 52. A final hologram 57 can then be made from this sub-subcopy hologram 55, as referred to in step 53.

Referring again to FIG. 1, by way of example, the points A, B may be representative of the copy hologram 47, while the points A', B' may be representative of the sub-subcopy hologram 55, which has a greater brightness uniformity or greater uniformity in efficiency than the former, as shown by the curve E. The process of making intermediate copies may be repeated as many times as desired to provide the desired uniformity in the final hologram 57, with each intermediate hologram providing a different hologram of greater uniform brightness from the former. The intermediate holograms must also be part of the optical design, and the number and positions of the intermediates can be calculated according to well-known principles in the art.

As to the final hologram 57, it will be highly uniform in brightness although it has not been overexposed, since the amount of exposure has been reduced from the earlier holograms. In other words, the copy hologram 47 may have been exposed, for example, at 150 mj/cm$^2$ for an X amount of time. The subcopy 49 may also be exposed at 150 mj/cm$^2$, but for a time less than X. This process continues through to the final hologram 57. Thus, if points A', B' are representative of the final hologram 57, the apparent effect is that hologram 57 has been overexposed at about 250 mj/cm$^2$ to provide better overall brightness.

While the invention is particularly adapted to constructing holographic head-up displays, the application is not limited to HUD's. All systems which involve complex optical power will benefit. This includes helmet mounted displays and automotive holographic displays.

As will be apparent, the just-described preferred embodiment is subject to numerous modifications and adaptations without departing from the scope and spirit of the invention. Therefore, it is to be understood that, within the scope of the appended claims, the invention may be practiced other than as specifically disclosed herein.

What is claimed is:

1. A method of reducing noise in computer generated holograms, comprising the steps of:

making a succession of intermediate copy holograms from a computer generated hologram; and varying an exposure of each intermediate copy hologram made wherein each intermediate copy hologram is subject to an exposure that is less than an earlier made copy hologram.

2. The method according to claim 1 further including the step of utilizing each intermediate copy hologram to make one of another intermediate copy hologram and a final hologram.

3. The method according to claim 1 further including the step of bringing said copy holograms successively towards an ideal overall brightness uniformity.

4. The method according to claim 1 further including the step of successively approaching an optimum brightness uniformity and thus overall efficiency in a final hologram by successively decreasing an exposure of said intermediate copy holograms.

5. In an improved method for producing intermediate copy holograms from a master hologram, wherein the improvement comprises the steps of:

making a succession of intermediate copy holograms from one another while decreasing an exposure of each intermediate copy hologram over a previously made intermediate copy hologram from which said former intermediate copy hologram was made.

6. The improvement according to claim 5 further including the steps of producing a master hologram from a computer generated hologram, said master hologram being used to produce an intermediate copy hologram.

7. The improvement according to claim 6 wherein the step of producing said master hologram occurs in a double beam exposure system.

8. The improvement according to claim 7 wherein the step of making said intermediate copy holograms occurs in a single beam exposure system.

9. The improvement according to claim 8 further including the step of adjusting an exposure position of each intermediate copy hologram in said single beam exposure system relative to another exposure position of an earlier made intermediate copy hologram.

* * * * *